(12) United States Patent
Negi

(10) Patent No.: US 11,759,987 B2
(45) Date of Patent: Sep. 19, 2023

(54) SCREW DRIVING DEVICE, INJECTION DEVICE AND INJECTION MOLDING MACHINE

(71) Applicant: THE JAPAN STEEL WORKS, LTD., Tokyo (JP)

(72) Inventor: Hiroshi Negi, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 3 days.

(21) Appl. No.: 17/673,170

(22) Filed: Feb. 16, 2022

(65) Prior Publication Data

US 2022/0258395 A1 Aug. 18, 2022

(30) Foreign Application Priority Data

Feb. 17, 2021 (JP) ................... 2021-023063

(51) Int. Cl.
*B29C 45/50* (2006.01)
*B29C 45/74* (2006.01)

(52) U.S. Cl.
CPC .......... *B29C 45/5008* (2013.01); *B29C 45/74* (2013.01)

(58) Field of Classification Search
CPC ...... B29C 2045/504; B29C 2045/5028; B29C 2045/5024
See application file for complete search history.

(56) References Cited

U.S. PATENT DOCUMENTS

| 6,227,839 B1* | 5/2001 | Yoshida | B29C 45/66 425/150 |
| 2002/0076465 A1* | 6/2002 | Knauff | B29C 45/5008 425/542 |
| 2004/0228944 A1* | 11/2004 | Kasai | B29C 45/5008 425/587 |

FOREIGN PATENT DOCUMENTS

| JP | 04197616 A * | 7/1992 | ......... B29C 45/5008 |
| JP | 2007301795 A | 11/2007 | |

* cited by examiner

*Primary Examiner* — Kelly M Gambetta
*Assistant Examiner* — Virak Nguon
(74) *Attorney, Agent, or Firm* — Sughrue Mion, PLLC

(57) ABSTRACT

A screw driving device includes: a plasticization motor; a rotation drive shaft provided coaxially with a screw and configured to rotate the screw; and a transmission mechanism configured to decelerate rotation of the plasticization motor and transmit the rotation to the rotation drive shaft. The transmission mechanism includes: a speed reducer whose output shaft is coupled to the rotation drive shaft; a drive rotation member provided in the plasticization motor; a driven rotation member provided on an input shaft of the speed reducer; and one endless string-shaped force transmission member wound around the drive rotation member and the driven rotation member.

13 Claims, 3 Drawing Sheets

SCREW DRIVING DEVICE, INJECTION DEVICE AND INJECTION MOLDING MACHINE

CROSS-REFERENCE TO RELATED APPLICATIONS

This application is based on and claims priority under 35 USC 119 from Japanese Patent Application No. 2021-023063 filed on Feb. 17, 2021, the contents of which are incorporated herein by reference.

TECHNICAL FIELD

The present disclosure relates to a screw driving device that drives a screw provided in a heating cylinder in an axial direction and a rotational direction, an injection device including the screw driving device, and an injection molding machine.

BACKGROUND

An injection device of an injection molding machine generally includes a heating cylinder, a screw housed in the heating cylinder, and a screw driving device that drives the screw. The screw driving device includes, for example, a fixed plate, an end plate, and a movable plate. The fixed plate and the end plate are provided in parallel and spaced apart from each other, and the movable plate is disposed between the fixed plate and the end plate. The fixed plate and the end plate are connected by a plurality of guide bars, and the guide bars penetrate the movable plate such that the movable plate is slidable along the guide bars. A rear end portion of the heating cylinder is fixed to the fixed plate, and a rear end portion of the screw penetrates the fixed plate to be provided on the movable plate. The screw is rotatable with respect to the movable plate, but movement in an axial direction is restricted.

The screw driving device includes an injection motor and a plasticization motor. The screw driving device includes a transmission mechanism for injection that transmits rotation of the injection motor, and the transmission mechanism includes a ball screw mechanism. The ball screw mechanism is provided between the end plate and the movable plate. Therefore, when the injection motor rotates, a rotational force is converted into a driving force in the axial direction by the ball screw mechanism to drive the movable plate. Thereby, the screw is driven in the axial direction, and an injection material can be injected.

The screw driving device is also provided with a transmission mechanism for plasticization that transmits rotation of the plasticization motor to the screw. The transmission mechanism for plasticization is formed of a speed reducer, for example, as disclosed in JP-A-2007-301795. The speed reducer is provided with an input shaft and an output shaft, the input shaft is directly connected to the plasticization motor, and the output shaft is connected to a rotation drive shaft that drives the screw. Therefore, when the plasticization motor is driven, rotation is decelerated and a torque is increased in the speed reducer to rotate the screw via the rotation drive shaft. That is, the injection material can be plasticized.

SUMMARY

When a transmission mechanism for plasticization is formed of a speed reducer, a rotation torque of a plasticization motor can be increased to rotate the screw with a large torque, which is particularly suitable for a large-sized injection device requiring a large torque. However, since the plasticization motor and the speed reducer are directly connected to each other, in other words, since a rotation shaft of the plasticization motor and an input shaft of the speed reducer are connected to each other, a leakage of a lubricating oil in the speed reducer may cause a failure in the plasticization motor.

The present disclosure provides a screw driving device, an injection device, and an injection molding machine capable of reducing as possibility of causing a failure in a plasticization motor.

Other problems and novel features will become apparent from the description of this specification and the accompanying drawings.

The screw driving device includes the plasticization motor, a rotation drive shaft provided coaxially with a screw and configured to rotate the screw, and a transmission mechanism configured to decelerate rotation of the plasticization motor and transmit the rotation to the rotation drive shaft. The transmission mechanism according to the present disclosure includes a speed reducer that rotates the screw and a mechanism that transmits the rotation of the plasticization motor to the speed reducer. That is, the plasticization motor is provided with a drive rotation member, an input shaft of the speed reducer is provided with a driven rotation member, and one endless string-shaped force transmission member is wound around the drive rotation member and the driven rotation member. An output shaft of the speed reducer is coupled to the rotation drive shaft.

The present disclosure has an effect of preventing a failure in a plasticization motor without contaminating the plasticization motor even if a lubricating oil in a speed reducer leaks.

DETAILED DESCRIPTION

Figure 1:
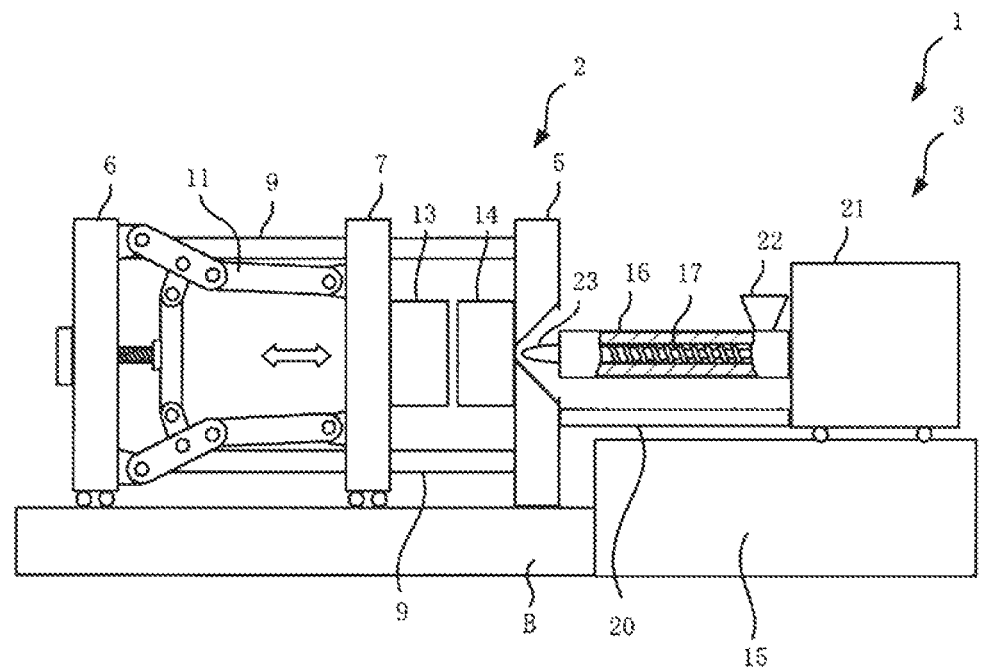
FIG. 1 is a front view showing an injection molding machine according to the present illustrative embodiment.

Hereinafter, specific illustrative embodiments will be described in detail with reference to the drawings. However, the present disclosure is not limited to the following illustrative embodiments. The following description and drawings are simplified as appropriate to clarify the description. In the drawings, the same elements are denoted by the same reference numerals, and repeated description thereof is omitted as necessary. In addition, hatching may be omitted to avoid complicating the drawings.

The present illustrative embodiment will be described.

<Injection Molding Machine>

An injection molding machine 1 according to the present illustrative embodiment is configured as shown in FIG. 1.

That is, the injection molding machine 1 is roughly configured by a mold clamping device 2 that clamps a mold and an injection device 3 that melts and injects an injection material.

<Mold Clamping Device>

In the present illustrative embodiment, the mold clamping device 2 includes a fixed platen 5 fixed on a bed B, a mold clamping housing 6 that slides on the bed B, and a movable platen 7 that slides on the bed B in the same manner. The fixed platen 5 and the mold clamping housing 6 are connected by a plurality of, for example, four tie-bars 9. The movable platen 7 is slidable between the fixed platen 5 and the mold clamping housing 6. A mold clamping mechanism 11 is provided between the mold clamping housing 6 and the movable platen 7. The mold clamping mechanism 11 may be a direct pressure mold clamping mechanism, that is, a mold clamping cylinder. However, the present illustrative embodiment provides a toggle mechanism. The fixed platen 5 and the movable platen 7 are respectively provided with molds 13, 14, and the mold clamping mechanism 11 is driven to open and close the molds 13, 14.

<Injection Device>

The injection device 3 is provided on a base 15, and includes a heating cylinder 16, a screw 17 housed in the heating cylinder 16, a screw driving device 19 according to the present illustrative embodiment that drives the screw 17 (see FIG. 2), and a nozzle touch device 20. Although the screw driving device 19 will be described in detail next with reference to FIG. 2, the screw driving device 19 is not shown in FIG. 1 due to being covered with a cover 21. A hopper 22 is provided in vicinity of a rear end portion of the heating cylinder 16, and an injection nozzle 23 is provided at a front end of the heating cylinder 16. When the nozzle touch device 20 is driven, the injection device 3 moves forward and the injection nozzle 23 touches a sprue of the mold 13.

<Screw Driving Device>

Figure 2:
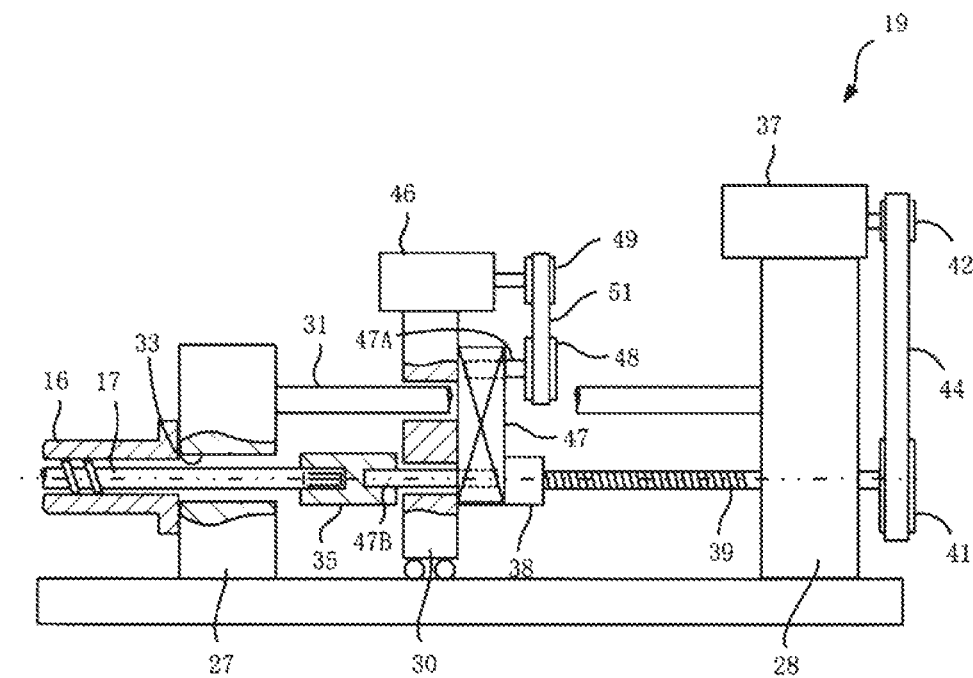
FIG. 2 is a front view showing a screw driving device and a part of a screw according to the present illustrative embodiment.
Figure 3:
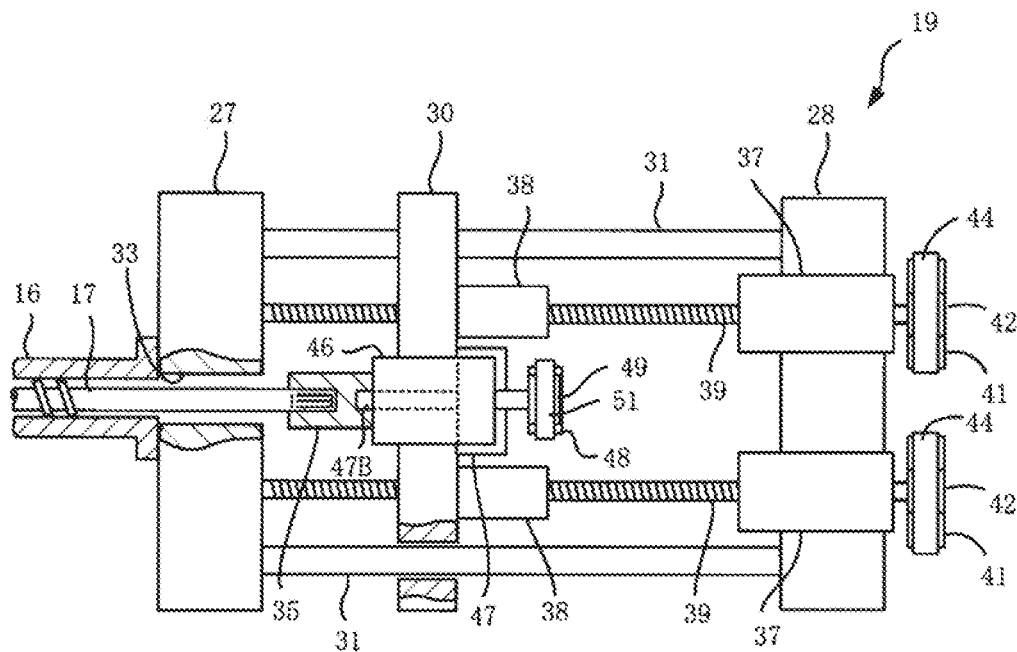
FIG. 3 is a top view showing the screw driving device d a part of the screw according to the present illustrative embodiment.

FIG. 2 shows a front view of the screw driving device 19 according to the present illustrative embodiment, and FIG. 3 shows a top view thereof, the screw driving device 19 includes a fixed plate 27, an end plate 28, and a movable plate 30. The fixed plate 27 and the end plate 28 are connected by a plurality of, in the present illustrative embodiment, two guide bars 31, 31, and the movable plate 30 slides while being guided by the guide bars 31, 31.

A hole 33 is drilled in the fixed plate 27, and the rear end portion of the heating cylinder 16 is fixed so as to be aligned with the hole 33. A rear end portion of the screw 17 penetrates the hole 33 and reaches vicinity of the movable plate 30. The rear end portion of the screw 17 is fixed to a rotation drive shaft 35 provided rotatably with respect to the movable plate 30. Therefore, the screw 17 is driven in an axial direction by sliding of the movable plate 30, and rotates with rotation of the rotation drive shaft 35.

<Injection Drive Mechanism>

The screw driving device 19 is provided with a drive mechanism that drives the screw 17 in the axial direction, that is, an injection drive mechanism. Specifically, the end plate 28 is provided with an injection motor 37, and the movable plate 30 is provided with a ball screw mechanism 38. A ball screw 39 of the ball screw mechanism 38 penetrates the end plate 28, and a tip end of the ball screw 39 protrudes from a surface of the end plate 28, where a first pulley 41 is provided. A second pulley 42 is provided on a rotation shaft of the injection motor 37, and a timing belt 44 is wound around the first pulley 41 and the second pulley 42.

Therefore, when the infection motor 37 rotates, the movable plate 30 is driven, and the screw 17 is driven in the axial direction.

<Plasticization Drive Mechanism>

The screw driving device 19 is provided with a drive mechanism that rotationally drives the screw 17, that is, a plasticization drive mechanism. The plasticization drive mechanism includes a plasticization motor 46 fixed to the movable plate 30 and a transmission mechanism that transmits rotation of the plasticization motor 46 to the rotation drive shaft 35 fixed to the screw 17.

The transmission mechanism constituting the plasticization drive mechanism has a characteristic configuration in the present illustrative embodiment. Specifically, the transmission mechanism includes a speed reducer 47, a driven rotation member 48 provided on an input shaft 47A of the speed reducer 47, a drive rotation member 49 provided on a rotation shaft of the plasticization motor 46, and one endless string-shaped force transmission member 51. The force transmission member 51 is wound around the drive rotation member 49 and the driven rotation member 48. An output shaft 47B of the speed reducer 47 is coupled to the rotation drive shaft 35. In the present illustrative embodiment, the drive rotation member 49 and the driven rotation member 48 are formed of a drive pulley and a driven pulley, respectively, and the three transmission member 51 is formed of a timing belt. That is, the present illustrative embodiment provides a belt pulley mechanism. However, these may include a drive sprocket, a driven sprocket, and a chain.

In the present illustrative embodiment, the transmission mechanism of the plasticization drive mechanism includes the speed reducer 47 and the belt pulley mechanism. Therefore, even if a lubricating oil contained in the speed reducer 47 leaks, the lubricating oil will not enter the plasticization motor 46 to cause a failure. By providing the belt pulley mechanism, a speed reduction ratio of the speed reducer 47 can be finely adjusted to some extent. That is, the speed reduction ratio of the speed reducer 47 can be finely adjusted to some extent by changing a ratio of a diameter of the first pulley 49 to a diameter of the second pulley 48. Here, since a speed of the plasticization motor 46 can be reduced by making the diameter of the second pulley 48 larger than the diameter of the first pulley 49, the speed reduction ratio of the speed reducer 47 can be reduced. For example, a two-stage speed reducer can be adopted instead of a three-stage speed reducer. Since the speed reducer 47 is not required to be directly connected to the plasticization motor 46, a relatively small speed reducer 47 can be adopted.

Further, a speed reduction ratio of the transmission mechanism can also be easily changed. This is because the speed reducer 47 and the belt pulley mechanism can be replaced and adjusted. This means that a desired speed reduction ratio can be achieved even when the plasticization motor 46 is replaced with another plasticization motor having a different motor capacity or a different motor shaft diameter.

Further, in the present illustrative embodiment, the input shaft 47A of the speed reducer 47 is disposed above an extension line of an axis of the screw 17 as shown in FIG. 2. That is, the input shaft 47A is spaced apart from the extension line of the axis of the screw 17. The screw driving device 19 is configured such that an axial center of the screw 17 is disposed at a center of the screw driving device 19, and a margin of space is small in vicinity of the center. In the present illustrative embodiment, since the input shaft 47A of the speed reducer 47 is spaced apart from the center of the screw driving device 19, there is a margin in arrangement of the driven rotation member 48. Thereby, the entire screw driving device 19 is compactly configured.

<Related-Art Screw Driving Device>

Figure 4:
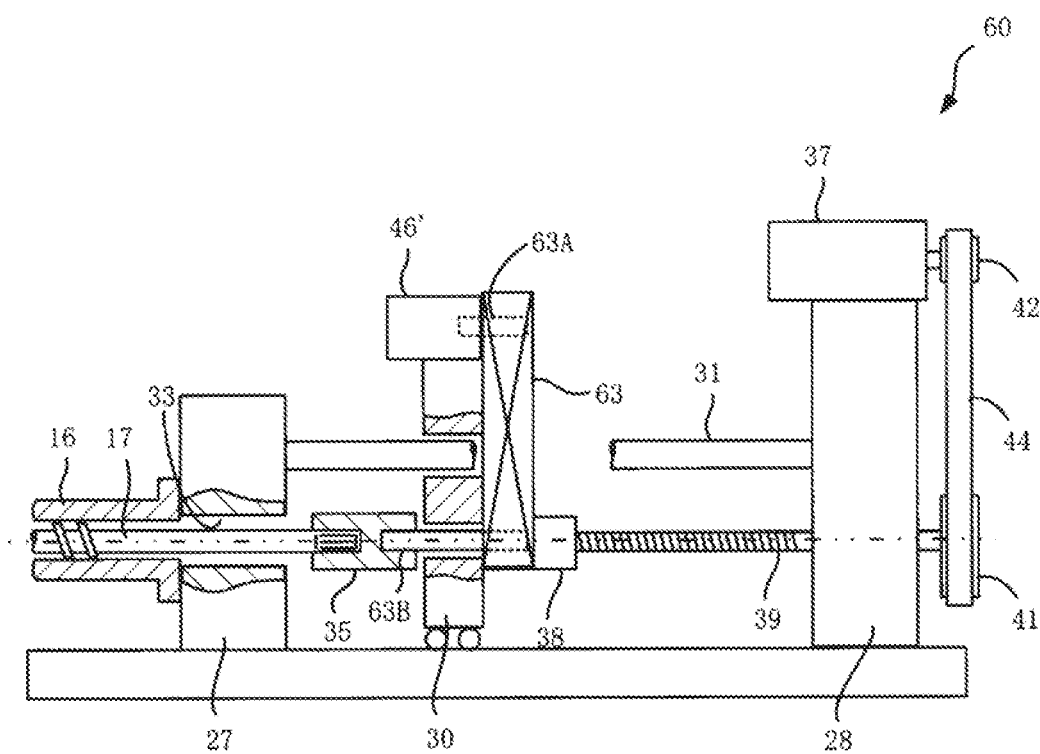
FIG. 4 is a front view showing a screw driving device and a part of a screw according to the related art.

Effects of the screw driving device 19 according to the present illustrative embodiment described above can be easily understood as compared with a related-art screw driving device 60. FIG. 4 shows the related-art screw driving device 60. In the related-art screw driving device 60, members having functions the same as those of the screw driving device 19 according to the present illustrative embodiment are denoted by the same reference numerals for convenience, and description thereof will be omitted.

In the related-art screw driving device 60, a plasticization drive mechanism includes a plasticization motor 46' and a transmission mechanism, but the transmission mechanism includes only a speed reducer 63. That is, a rotation shaft of the plasticization motor 46' is an input shaft 63A of the speed reducer 63, and an output shaft 63B of the speed reducer 63 is connected to the rotation drive shaft 35 fixed to the screw 17. Therefore, a leakage of a lubricating oil in the speed reducer 63 may cause a failure in the plasticization motor 46'. Since speed reduction needs to be performed only by the speed reducer 63, a size of the speed reducer 63 is inevitably increased, and it is difficult to replace the speed reducer 63 with a speed reducer having a different size. It is also difficult to replace the plasticization motor with a plasticization motor having a different motor capacity or a different motor shaft diameter.

Although not particularly shown in the drawing, a related-art screw driving device having a different structure may be a screw driving device in which a transmission mechanism that transmits rotation of the plasticization motor 40 to the screw 17 is constituted only by a belt pulley mechanism That is, the speed reducer 47 may not be provided. However, since it is difficult to increase a speed reduction ratio of the belt pulley mechanism, the belt pulley mechanism cannot be adopted in a case of an injection molding machine such as a medium-sized machine or a large-sized machine. This is because, in the injection molding machine such as the medium-sired machine or the large-sized machine, the screw 17 needs to be driven with a large torque, and the speed reducer 47 capable of realizing a large speed reduction ratio is indispensable.

Other Illustrative Embodiments

Figure 5:
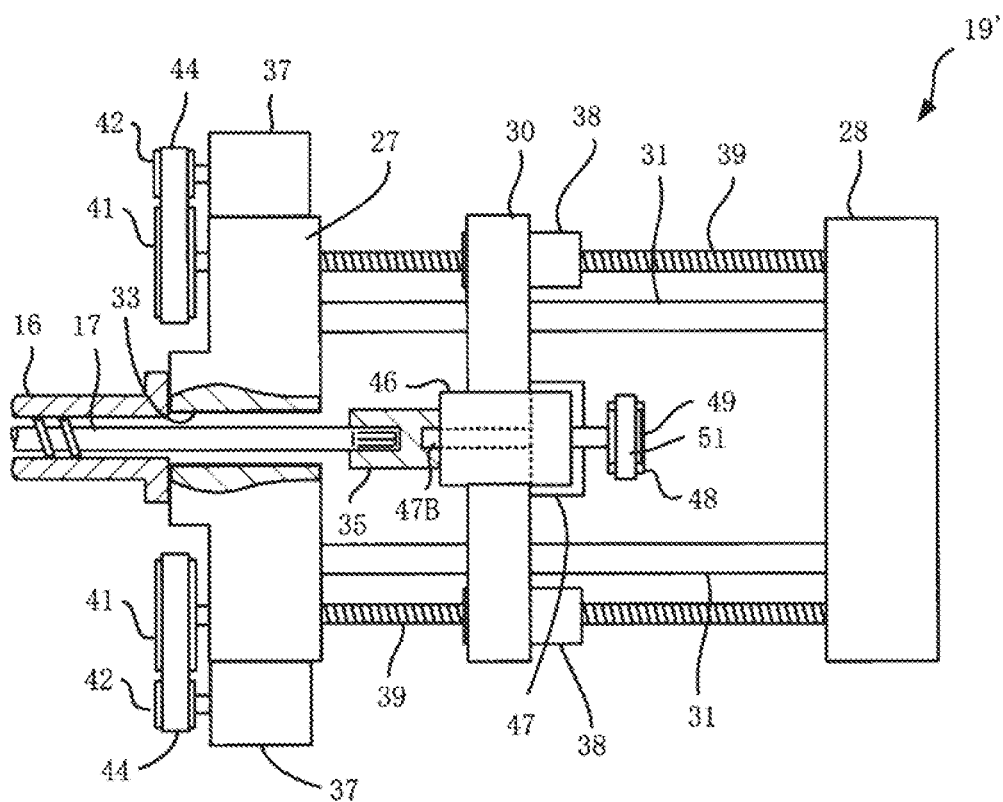
FIG. 5 is a top view showing a screw driving device and a part of a screw according to a different illustrative embodiment.

The screw driving device 19 according to the present illustrative embodiment can be variously modified. FIG. 5 shows a screw driving device 19' according to another illustrative embodiment in which attachment positions of the injection motors 37, 37 are changed. In this illustrative embodiment, the injection motors 37, 37 are provided on the fixed plate 27. Therefore, the first pulleys 41, 41, the second pulleys 42, 42, and the timing belts 44, 44 are also provided on a fixed plate 27 side. A further modification is also possible. Although it has been described that two injection motors 37, 37 and one plasticization motor 46 are provided, the number thereof may be changed. For example, the number of injection motors 37 may be changed to four, and the number of plasticization motors 46 may be changed to two.

Although the disclosure made by the present inventor has been specifically described based on the illustrative embodiments, it is needless to say that the present disclosure is not limited to the illustrative embodiments described above, and various modifications can be made without departing from the scope of the disclosure. A plurality of examples described above can be implemented in combination as appropriate.

What is claimed is:

1. A screw driving device comprising:
   a plasticization motor;
   a rotation drive shaft provided coaxially with a screw and configured to rotate the screw; and
   a transmission mechanism configured to decelerate rotation of the plasticization motor and transmit the rotation to the rotation drive shaft,
   wherein the transmission mechanism includes:
      a speed reducer whose output shaft is coupled to the rotation drive shaft;
      a drive rotation member provided in the plasticization motor;
      a driven rotation member provided on an input shaft of the speed reducer; and
      one endless string-shaped force transmission member wound around the drive rotation member and the driven rotation member
   wherein the input shaft of the speed reducer connects to the speed reducer through a first axis, and the output shaft of the speed reducer connects to the speed reducer through a second axis provided coaxially to the rotation drive shaft and the screw,
   wherein the first axis and the second axis are parallel.

2. The screw driving device according to claim 1, wherein the drive rotation member is formed of a drive pulley, the driven rotation member is formed of a driven pulley, and the force transmission member is formed of a timing belt.

3. The screw driving device according to claim 1, wherein the input shaft of the speed reducer is disposed at a position spaced apart from an extension line of an axis of the screw.

4. The screw driving device according to claim 1, wherein the screw and the rotation drive shaft are integrally connected.

5. The screw driving device according to claim 1, wherein the input shaft of the speed reducer is disposed in an upper portion of the speed reducer and the output shaft of the speed reducer is disposed in a lower portion of the speed reducer,
   wherein an axis of the input shaft is parallel to an axis of the output shaft.

6. An injection device comprising:
   a heating cylinder;
   a screw provided in the heating cylinder; and
   a screw driving device configured to drive the screw,
   wherein the screw driving device includes:
      a plasticization motor;
      a rotation drive shaft provided coaxially with the screw and configured to rotate the screw; and
      a transmission mechanism configured to decelerate rotation of the plasticization motor and transmit the rotation to the rotation drive shaft, and
   wherein the transmission mechanism includes:
      a speed reducer whose output shaft is coupled to the rotation drive shaft;
      a drive rotation member provided in the plasticization motor;
      a driven rotation member provided on an input shaft of the speed reducer; and
      one endless string-shaped force transmission member wound around the drive rotation member and the driven rotation member wherein the input shaft of the speed reducer connects to the speed reducer through a first axis, and the output shaft of the speed reducer connects to the speed reducer through a second axis provided coaxially to the rotation drive shaft and the screw, wherein the first axis and the second axis are parallel.

7. The injection device according to claim 6,
wherein the drive rotation member is formed of a drive pulley, the driven rotation member is formed of a driven pulley, and the force transmission member is formed of a timing belt.

8. The injection device according to claim 6,
wherein the input shaft of the speed reducer is disposed at a position spaced apart from an extension line of an axis of the screw.

9. The injection device according to claim 6,
wherein the screw and the rotation drive shaft are integrally connected.

10. An injection molding machine including:
an injection device configured to inject a resin; and
a mold clamping device configured to clamp a mold,
wherein the injection device includes:
 a heating cylinder;
 a screw provided in the heating cylinder; and
 a screw driving device configured to drive the screw,
wherein the screw driving device includes:
 a plasticization motor;
 a rotation drive shaft provided coaxially with the screw and configured to rotate the screw; and
 a transmission mechanism configured to decelerate rotation of the plasticization motor and transmit the rotation to the rotation drive shaft, and wherein the transmission mechanism includes:
 a speed reducer whose output shaft is coupled to the rotation drive shaft;
 a drive rotation member provided in the plasticization motor;
 a driven rotation member provided on an input shaft of the speed reducer; and
 one endless string-shaped force transmission member wound around the drive rotation member and the driven rotation member wherein the input shaft of the speed reducer connects to the speed reducer through a first axis, and the output shaft of the speed reducer connects to the speed reducer through a second axis provided coaxially to the rotation drive shaft and the screw, wherein the first axis and the second axis are parallel.

11. The injection molding machine according to claim 10,
wherein the drive rotation member is formed of a drive pulley, the driven rotation member is formed of a driven pulley, and the force transmission member is formed of a timing belt.

12. The injection molding machine according to claim 10,
wherein the input shaft of the speed reducer is disposed at a position spaced apart from an extension line of an axis of the screw.

13. The injection molding machine according to claim 10,
wherein the screw and the rotation drive shaft are integrally connected.

* * * * *